(12) United States Patent
Wang et al.

(10) Patent No.: US 8,024,174 B2
(45) Date of Patent: Sep. 20, 2011

(54) METHOD AND APPARATUS FOR TRAINING A PROSODY STATISTIC MODEL AND PROSODY PARSING, METHOD AND SYSTEM FOR TEXT TO SPEECH SYNTHESIS

(75) Inventors: Haifeng Wang, Beijing (CN); Guohua Li, Beijing (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 1381 days.

(21) Appl. No.: 11/539,434

(22) Filed: Oct. 6, 2006

(65) Prior Publication Data

US 2007/0129938 A1    Jun. 7, 2007

(30) Foreign Application Priority Data

Oct. 9, 2005    (CN) .......................... 2005 1 0108186

(51) Int. Cl.
*G06F 17/28*    (2006.01)
(52) U.S. Cl. ......................................................... 704/6
(58) Field of Classification Search ........................ 704/6
See application file for complete search history.

(56) References Cited

U.S. PATENT DOCUMENTS

| | | | | |
|---|---|---|---|---|
| 3,704,345 A * | 11/1972 | Coker et al. | ................ | 704/266 |
| 5,890,117 A * | 3/1999 | Silverman | ................ | 704/260 |
| 6,961,704 B1 * | 11/2005 | Phillips et al. | ................ | 704/268 |
| 7,580,838 B2 * | 8/2009 | Divay et al. | ................ | 704/257 |
| 2005/0234724 A1 * | 10/2005 | Aaron et al. | ................ | 704/260 |

FOREIGN PATENT DOCUMENTS

JP    2005-31259    2/2005

OTHER PUBLICATIONS

Chen Weijun, et al., "Prosodic Phrase Analysis Based on Probability and Statistics", Computer Engineering and Applications, Mar. 31, 2001, pp. 10-11 and 34.
Zhiqiang Yang, et al., "Study on Segmentation of Prosodic Phrases in Chinese", Computer Engineering, vol. 28, No. 2, Feb. 28, 2002, pp. 131-133.
Japanese Office Action dated Oct. 12, 2010.

* cited by examiner

*Primary Examiner* — Jakieda Jackson
(74) *Attorney, Agent, or Firm* — Oblon, Spivak, McClelland, Maier & Neustadt, L.L.P.

(57) ABSTRACT

The present invention provides a method and apparatus for training a prosody statistic model and prosody parsing, a method and system for text to speech synthesis. Said method for training a prosody statistic model with a raw corpus that includes a plurality of sentences with punctuation, comprising: transforming said plurality of sentences in said raw corpus into a plurality of token sequences respectively; counting a frequency for each adjacent token pair occurring in said plurality of token sequences and frequencies of punctuation that represents a pause occurring at associated positions of said each token pair; calculating pause probabilities at said associated positions of said each token pair; and constructing said prosody statistic model based on said token pairs and said pause probabilities at associated positions thereof. With the present invention a prosody statistic model can be trained from a raw corpus without manually prosody parsing tags. And the prosody statistic model can be used in the prosody parsing and further voice synthesis.

35 Claims, 6 Drawing Sheets

METHOD AND APPARATUS FOR TRAINING A PROSODY STATISTIC MODEL AND PROSODY PARSING, METHOD AND SYSTEM FOR TEXT TO SPEECH SYNTHESIS

TECHNICAL FIELD OF THE INVENTION

The present invention relates to the technology of voice synthesis, in particular, to the technology of prosody parsing in voice synthesis and the technology of training a prosody statistic model.

BACKGROUND OF THE INVENTION

The goal of a system for text to speech synthesis (TTS) is to make a computer speak out natural voice as a man does. When a man is reading a sentence naturally, apart from some of the punctuations (e.g. period, comma, etc.) as inherent pause indications, there will be some pause at locations without punctuation. Thus, in order to achieve synthesis voice with higher quality, the voice synthesis system should have the ability to automatically decide which locations without punctuation also needs to pause, which needs to perform prosody parsing on the text as a front-end process to help to improve the quality of voice synthesis.

There is proposed a rule-learning based method for predicting Chinese prosody structure in "Rule-learning based prosodic structure prediction", ZHAO Sheng, et al, Journal of Chinese Information Processing, Vol. 16, No. 5, 2002.9, PP. 30-37. The method extracts linguistic features and two-level prosodic structure tags from a manually prosodic labeled corpus, establishes an example database, and then automatically induces rules for prosodic phrase prediction from the example by using rule-learning algorithms.

However, in the foregoing method, a large amount of corpus that has been prosody parsed in advance is needed, whereas performing prosody parsing on a corpus is an arduous work and it is hard to control its quality.

SUMMARY OF THE INVENTION

To solve the above problem in the prior art, the invention provides a method and apparatus for training a Chinese prosody statistic model with a raw corpus that do not need manual labeling, a method and apparatus for Chinese prosody parsing, and a method and system for Chinese voice synthesis.

According to one aspect of the invention, there is provided a method for training a prosody statistic model with a raw corpus that includes a plurality of sentences with punctuations, comprising: transforming said plurality of sentences in said raw corpus into a plurality of token sequences respectively; counting the frequency of each adjacent token pair occurring in said plurality of token sequences and frequencies of punctuation that represents a pause occurring at associated positions of said each token pair; calculating pause probabilities at said associated positions of said each token pair; and constructing said prosody statistic model based on said token pairs and said pause probabilities at associated positions thereof.

According to another aspect of the invention, there is provided a method for prosody parsing, comprising: training a prosody statistic model by using said method for training a prosody statistic model with a raw corpus; inputting a text for prosody parsing, which includes at least one sentence; transforming the sentence into a token sequence; calculating a pause weight for each pause position in said token sequence based on said prosody statistic model; and selecting one or more pause positions to insert a pause tag according to said calculated pause weight for each pause position.

According to another aspect of the invention, there is provided a method for text to speech synthesis, comprising: inserting at least one pause tag into the text by using said method for prosody parsing, and performing voice synthesis according to the text inserted with said at least one pause tag.

According to another aspect of the invention, there is provided an apparatus for training a prosody statistic model with a raw corpus that includes a plurality of sentences with punctuations, comprising: a tokenization unit configured to transform said plurality of sentences in said raw corpus into a plurality of token sequences respectively; a counter configured to count the frequency of each adjacent token pair occurring in said plurality of token sequences and frequencies of punctuation that represents a pause occurring at associated positions of said each token pair; a pause probability calculator configured to calculate pause probabilities at said associated positions of said each token pair; and a prosody statistic model constructor configured to construct said prosody statistic model based on said token pairs and said pause probabilities at associated positions thereof.

According to another aspect of the invention, there is provided an apparatus for prosody parsing, comprising: a text input unit configured to input a text for prosody parsing, which includes at least one sentence; a tokenization unit configured to transform the sentence into a token sequence; a pause weight calculator configured to calculate the pause weight for each pause position in said token sequence based on a prosody statistic model that is trained from a raw corpus and includes a plurality of token pairs and pause probabilities at associated positions of each said plurality of token pairs; and a pause tag setting unit configured to select at least one pause positions to insert a pause tag according to said calculated pause weight for each pause position.

According to another aspect of the invention, there is provided a system for text to speech synthesis, comprising: said apparatus for prosody parsing; and a voice synthesizer configured to perform voice synthesis according to the text inserted with said at least one pause tag.

BRIEF DESCRIPTION OF THE DRAWINGS

It is believed that the features, advantages and purposes of the present invention will be better understood from the following description of the detailed implementation of the present invention read in conjunction with the accompanying drawings, in which.

DETAILED DESCRIPTION OF THE PREFERRED EMBODIMENTS

Next, various preferred embodiments of the invention will be described in detail in conjunction with accompany drawings.

The inventor of the invention has noticed that a corpus (sentences) that has not been manually processed contains a great deal of pause information, for example, punctuations such as periods, commas, etc. The information of the punctuations that represents pause can be utilized to train a prosody statistic model, thereby avoiding the problem of manually performing prosody labeling on the corpus.

Figure 1:
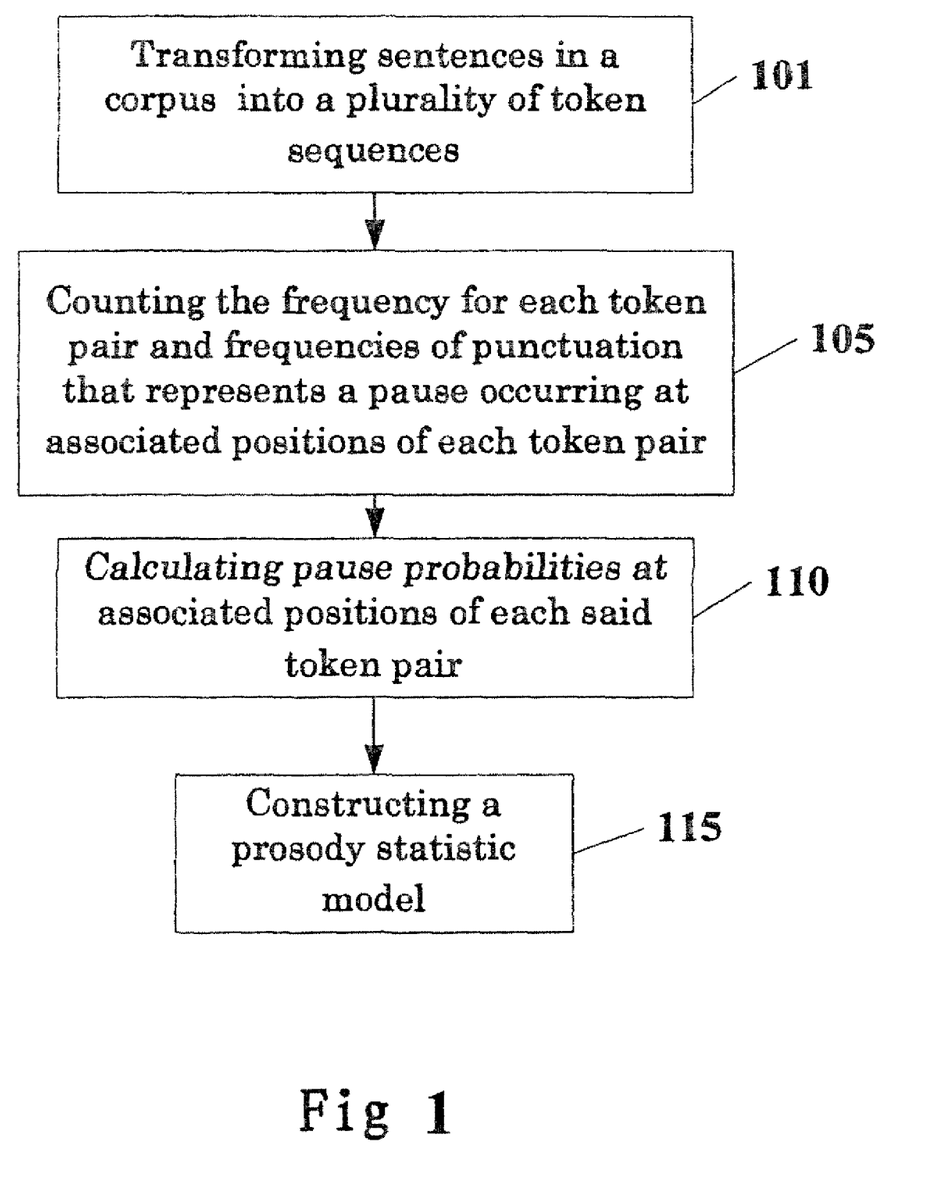
FIG. 1 is a flowchart of the method for training a prosody statistic model with a raw corpus according to one embodiment of the invention.

FIG. 1 is a flowchart of the method for training a prosody statistic model with a raw corpus according to one embodiment of the invention. The prosody statistic model trained by using the method of the present embodiment will be used in the following method for prosody parsing and the method and apparatus for voice synthesis described in conjunction with other embodiments.

As shown in FIG. 1, first at Step 101, sentences in a raw corpus are transformed into a plurality of token sequences. What is employed in the present embodiment is a raw corpus that has not been manually labeled. The raw corpus includes a plurality of sentences, each of which includes one or more punctuations. The present embodiment is to train a prosody statistic model with the punctuations to extract prosody information.

In particular, in the present step, sentences in the corpus are transformed into a plurality of token sequences one by one. Here, a token is a term in the field of natural language processing technology, which represents a basic unit that constitutes a sentence of a natural language. The process of transforming the sentences in a corpus into a plurality of token sequence is usually called "tokenization". The token in the present embodiment may be in the form of a character, a word, a word plus the part of speech or a phrase, etc., as long as it is in the same form as the token employed in the method for prosody parsing and the method for voice synthesis described in the following embodiments.

Next, at Step 105, the frequency for each continuous token pair occurring in these token sequences and frequencies of punctuation that represents a pause occurring at associated positions of each token pair are counted. In particular, the associated positions of each token pair include: before, after and amid that token pair. Assume that a token sequence is "$t_1$, $t_2$, punct, $t_3$, $t_4$", wherein there is a punctuation punct (e.g. a comma) that represents a pause amid $t_2$ and $t_3$.

In this case, the frequencies of token pair ($t_1$, $t_2$), ($t_2$, $t_3$) and ($t_3$, $t_4$) occurring are incremented by one, respectively;

the frequency of pause ($t_1$, $t_2$, punct) after token pair ($t_1$, $t_2$) is incremented by one (ttp type, Token Token Punctuation);

the frequency of pause ($t_2$, punct, $t_3$) amid token pair ($t_2$, $t_3$) is incremented by one (tpt type, Token Punctuation Token);

the frequency of pause (punct, $t_3$, $t_4$) before token pair ($t_3$, $t_4$) is incremented by one (ptt type, Punctuation Token Token).

In the present step, each sentence in the corpus is processed one by one, the frequencies of all token pairs that occur and frequencies of punctuation that represents a pause occurring at the associated positions of each token pair are counted.

Next, at Step 110, pause probabilities at associated positions of each token pair are calculated. In particular, the pause probability before token pair $Prob_{ptt}$ is calculated with the following formula (1)

$$Prob_{ptt} = \frac{Count_{ptt}}{Count_{tt}} \quad (1)$$

wherein, $Count_{tt}$ represents the frequency of said token pair, $Count_{ptt}$ represents the frequency of punctuation representing a pause occurring before said token pair.

The pause probability after token pair $Prob_{ttp}$ is calculated with the following formula (2)

$$Prob_{ttp} = \frac{Count_{ttp}}{Count_{tt}} \quad (2)$$

wherein $Count_{tt}$ represents the frequency of said token pair, $Count_{ttp}$ represents the frequency of punctuation representing a pause occurring after said token pair.

The pause probability amid token pair $Prob_{tpt}$ is calculated with the following formula (3)

$$Prob_{tpt} = \frac{Count_{tpt}}{Count_{tt}} \quad (3)$$

wherein $Count_{tt}$ represents the frequency of said token pair, $Count_{tpt}$ represents the frequency of punctuation representing a pause occurring amid said token pair.

Next, at Step 115, a prosody statistic model is constructed and the above counted and calculated token pairs and pause probabilities at associated positions thereof are stored in the prosody statistic model.

From the above description it can be seen that the method of the present embodiment can train a prosody statistic model by using a raw corpus that has not been manually labeled, and further, the prosody statistic model can be used in the prosody parsing and voice synthesis described later.

In addition, according to other preferred embodiments of the invention, when calculating pause probabilities at associated positions of each token pair, smoothing and cutoff are performed on the statistical data, thereby avoiding the problem brought about by data sparseness. Smoothing and cutoff are common processes used in the art, and for reference, see "Self-organized language modeling for speech recognition", F. Jelinek, Readings in Speech Recognition, A. Waibel and K. F. Lee, eds., Morgan-Kaufmann, San Mateo, Calif., 1990, pp. 450-506.

In addition, according to another preferred embodiment of the invention, there is also a token translation table that stores each of the tokens involved in the prosody statistic model and a token ID corresponding to that token. When storing pause probabilities at associated positions of each token pair, the ID of the token can be employed to represent the corresponding token. The prosody statistic model thus constructed can save storage space, and the token translation table can be used as token indexes in the token translation in the following described prosody parsing to improve the processing speed.

Figure 2:
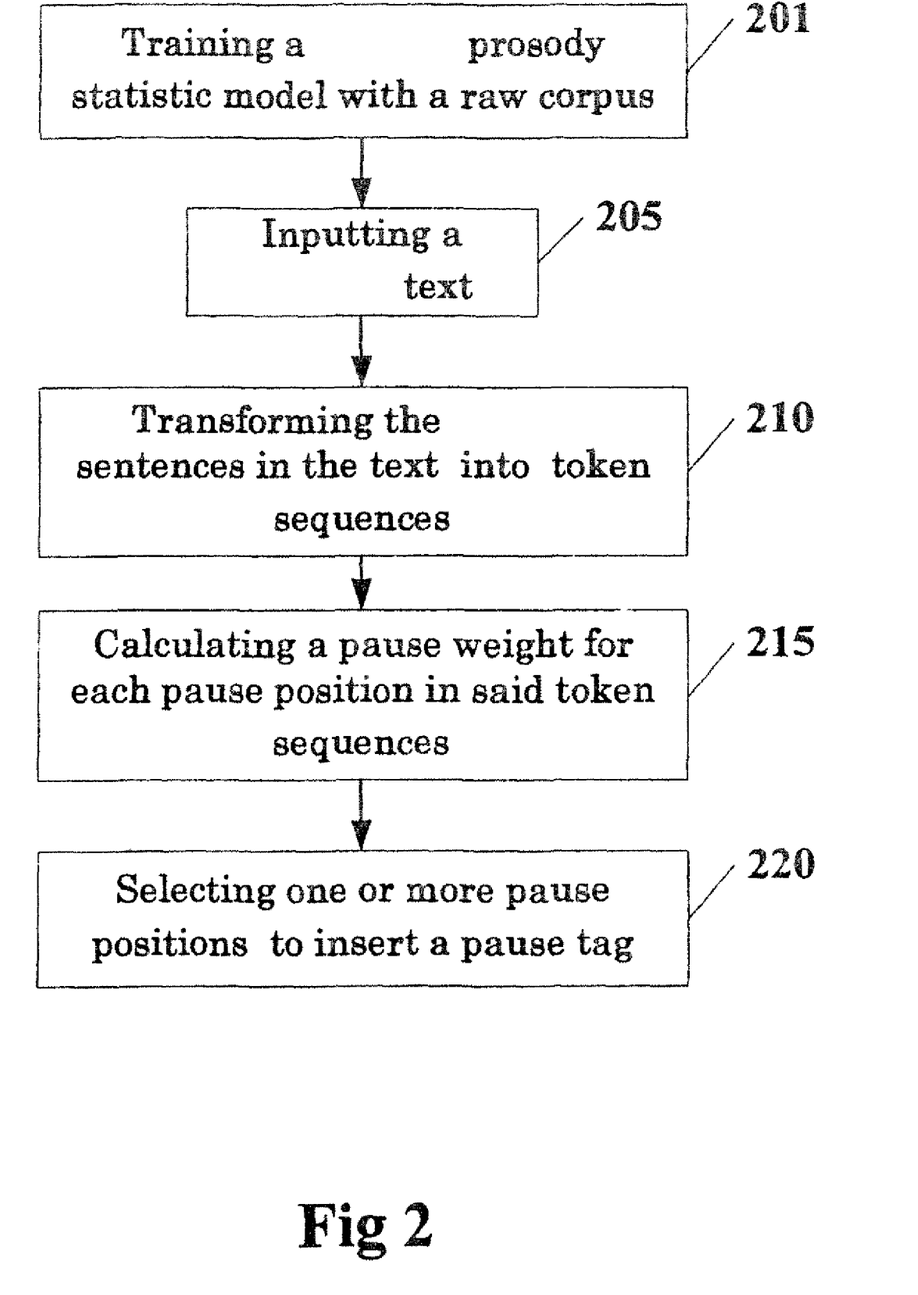
FIG. 2 is a flowchart of the method for prosody parsing according to one embodiment of the invention.

Under the same inventive conception, FIG. 2 is a flowchart of the method for prosody parsing according to one embodiment of the invention. The method for prosody parsing of the present embodiment trains a prosody statistic model by using the method of the above embodiment to perform prosody parsing on the sentences to be processed.

As shown in FIG. 2, first at Step 201, a prosody statistic model is trained by using a raw corpus. In particular, the foregoing method for training a prosody statistic model described in conjunction with FIG. 1 can be employed to train the prosody statistic model.

Next, at Step 205, a text for prosody parsing is inputted, which includes at least one sentence.

Next, at Step 210, the sentences in the text are transformed into token sequences. Similar to the Step 101 in the above embodiment, the token in the present embodiment may be in the form of a character, a word, a word plus the part of speech or a phrase, etc., as long as it is in the same form as the token employed in the method for training a prosody statistic model described in the above embodiment and the method for voice synthesis described in the following embodiment.

Next, at Step 215, a pause weight for each pause position in said token sequence is calculated based on said prosody statistic model. In particular, a pause weight for each pause position in said token sequence is calculated according to the pause probabilities at associated positions of the corresponding token pairs in the prosody statistic model.

For example, for the token sequence "$t_1, t_2, t_3, t_4$", the pause weight for the pause position amid "$t_2$" and "$t_3$" weight may be calculated with the following formula (4).

$$\text{weight} = -\log(\text{Prob}_{ttp} \times \text{Prob}_{tpt} \times \text{Prob}_{ptt}) \tag{4}$$

wherein $\text{Prob}_{ttp}$ represents the pause probability after the token pair that is located before said pause position, i.e., the pause probability after $t_1$ and $t_2$; $\text{Prob}_{ptt}$ represents the pause probability before the token pair that is located after said pause position, i.e., the pause probability before $t_3$ and $t_4$; and $\text{Prob}_{tpt}$ represents the pause probability amid the token pair that is located across said pause position, i.e., the pause probability amid $t_2$ and $t_3$.

Preferably, in the present embodiment, the pause position is not set after the first token of the token sequence or before the last token of the token sequence.

Then, at Step 220, at least one pause position is selected to insert a pause tag according to said calculated pause weight for each pause position. In particular, those pause positions the pause weight of which is higher than a predetermined threshold can be selected to insert a pause tag. Further, preferably, another condition is to be satisfied, i.e., the number of tokens between two selected adjacent pause positions should be larger than another predetermined threshold, which could avoid too many and too fragmentary pauses.

From the above description it can be seen that with the method for prosody parsing of the present embodiment, prosody parsing can be performed on the sentences in a text to insert pause tags according to the prosody statistic model trained with a raw corpus.

Figure 3:
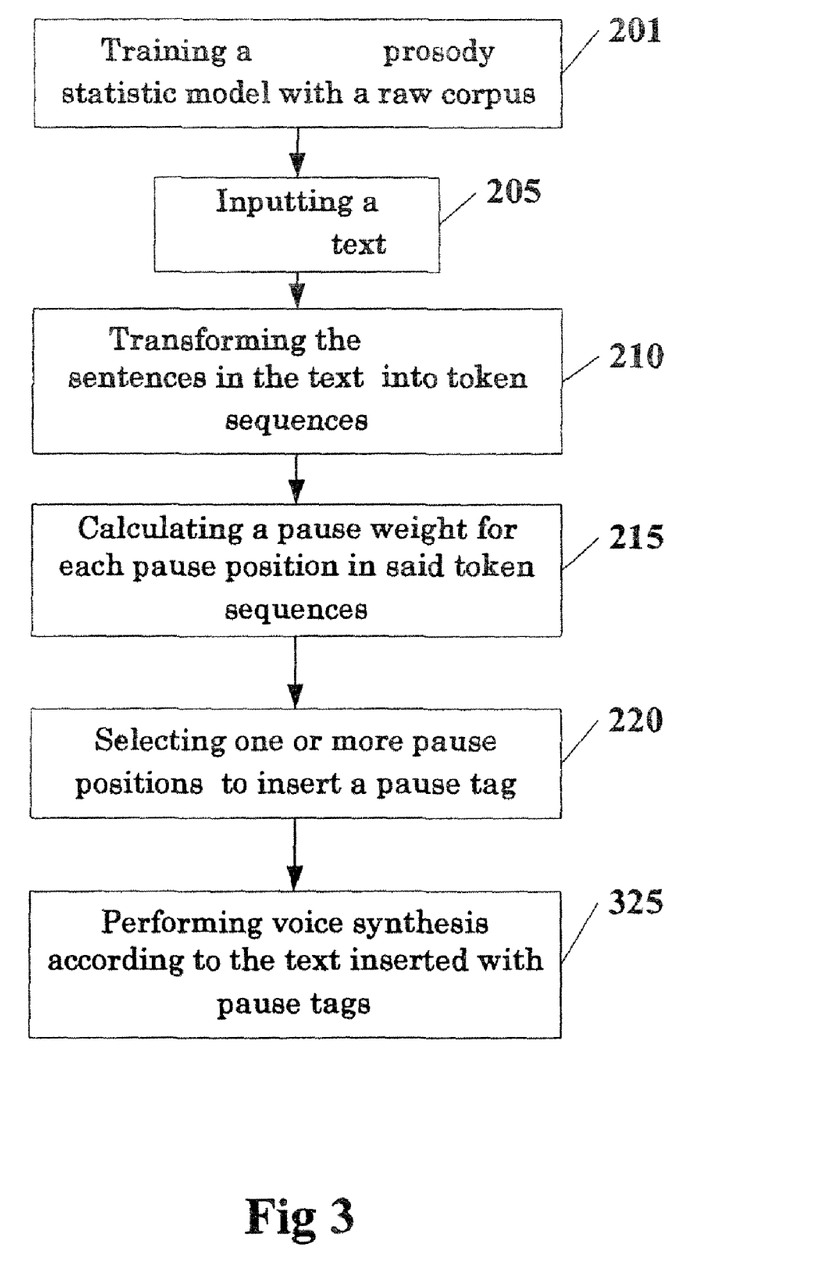
FIG. 3 is a flowchart of the method for text to speech synthesis according to one embodiment of the invention.

Under the same inventive conception, FIG. 3 is a flowchart of the method for text to speech synthesis according to one embodiment of the invention. The present embodiment will be described in the following in conjunction with FIG. 3, in which the same elements as those in the above embodiments will be labeled with the same numerals and the description thereof will be properly omitted.

As shown in FIG. 3, Step 201~220 in the present embodiment are the same as those in the embodiment shown in FIG. 2 and the description thereof will not be repeated. At Step 325, voice synthesis is performed according to the text inserted with said pause tags through the above Step 201~220. In particular, corresponding to the inserted pause tags, the corresponding pauses are inserted into the voice.

With the method for text to speech synthesis of the present embodiment, pause tags can be inserted into the sentences in the text according to the prosody statistic model trained with the raw corpus, and further, the quality of voice synthesis can be improved according to these pause tags, thereby making the synthesized voice more natural and more understandable.

Figure 4:
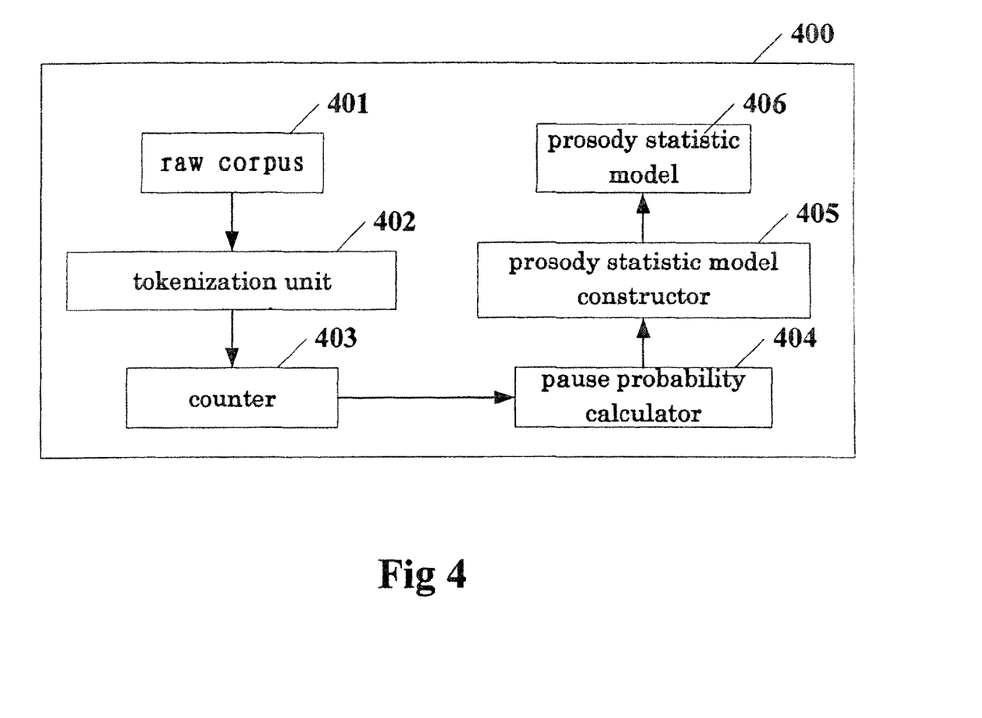
FIG. 4 is a block diagram of the apparatus for training a prosody statistic model with a raw corpus according to one embodiment of the invention.

Under the same inventive conception, FIG. 4 is a block diagram of the apparatus for training a prosody statistic model with a raw corpus according to one embodiment of the invention. The present embodiment will be described in the following in conjunction with FIG. 4. For the same elements as those in the above embodiments, the description thereof will be properly omitted.

As shown in FIG. 4, the apparatus 400 of the present embodiment for training a prosody statistic model with a raw corpus comprises: a raw corpus library 401 that stores therein a raw corpus that has not been manually labeled, the raw corpus including a plurality of sentences with punctuations; a tokenization unit 402 configured to transform said plurality of sentences in said raw corpus into a plurality of token sequences respectively; a counter 403 configured to count the frequency of each adjacent token pair occurring in said plurality of token sequences and frequencies of punctuation that represents a pause occurring at associated positions of said each token pair; a pause probability calculator 404 configured to calculate pause probabilities at said associated positions of said each token pair; and a prosody statistic model constructor 405 configured to construct a prosody statistic model 406 based on said token pairs and said pause probabilities at associated positions thereof calculated by the pause probability calculator 404.

As in the foregoing embodiments, said token is in the form of any one selected from character, word, word plus the part of speech and phrase in the present embodiment. Said associated positions of said each token pair includes: before, after and amid said token pair. The counter 403 counts the frequencies of punctuation that represents a pause occurring at positions before, after and amid said each token pair.

The pause probability calculator 404 calculates a pause probability before a token pair based on the frequency of said token pair and the frequency of punctuation representing a pause occurring before said token pair, for example, calculating the pause probability before said token pair $\text{Prob}_{ptt}$ with $$\text{Prob}_{ptt} = \frac{\text{Count}_{ptt}}{\text{Count}_{tt}}$$

wherein $\text{Count}_{tt}$ represents the frequency of said token pair, $\text{Count}_{ptt}$ represents the frequency of punctuation representing a pause occurring before said token pair.

Further, the pause probability calculator 404 calculates a pause probability after said token pair based on the frequency of said token pair and the frequency of punctuation representing a pause occurring after said token pair, for example, calculating the pause probability after said token pair $\text{Prob}_{ttp}$ with $$\text{Prob}_{ttp} = \frac{\text{Count}_{ttp}}{\text{Count}_{tt}}$$

wherein $\text{Count}_{tt}$ represents the frequency of said token pair, $\text{Count}_{ttp}$ represents the frequency of punctuation representing a pause occurring after said token pair.

Further, the pause probability calculator 404 calculates a pause probability amid said token pair based on the frequency of said token pair and the frequency of punctuation representing a pause occurring amid said token pair, for example, calculating the pause probability amid said token pair $Prob_{tpt}$ with $$Prob_{tpt} = \frac{Count_{tpt}}{Count_{tt}}$$

wherein $Count_{tt}$ represents the frequency of said token pair, $Count_{tpt}$ represents the frequency of punctuation representing a pause occurring amid said token pair.

In addition, although not shown in FIG. 4, the apparatus 400 of the present embodiment for training a prosody statistic model with a raw corpus can further comprise: a smoothing unit configured to perform a smoothing process on said calculated pause probabilities; and a cutoff unit configured to perform a cutoff process on said calculated pause probabilities.

In addition, similar to the foregoing embodiments, preferably, the present embodiment can further comprise a token translation table that stores the tokens involved in the prosody statistic model and the token IDs corresponding to the tokens. The token translation table can be included in the tokenization unit 402 to be implemented as part of it or be implemented separately. Further, when storing pause probabilities at associated positions of each token pair in the prosody statistic model, the ID of a token can be employed to represent a corresponding token. A prosody statistic model thus constructed can save storage space, and the token translation table can be used as token indexes in the token translation in the following described prosody parsing to improve processing speed. Also, as part of the prosody statistic model, the token translation table can be transferred to the following described apparatus for prosody parsing and system for text to speech synthesis along with the prosody statistic model.

The apparatus 400 of the present embodiment for training a prosody statistic model with a raw corpus and its various components can be constructed with a specialized circuit or chip or be implemented by a computer (processor) executing a corresponding program. Also, the apparatus 400 of the present embodiment for training a prosody statistic model with a raw corpus can in operation implement the method for training a prosody statistic model with a raw corpus of the embodiment described in conjunction with FIG. 1.

Figure 5:
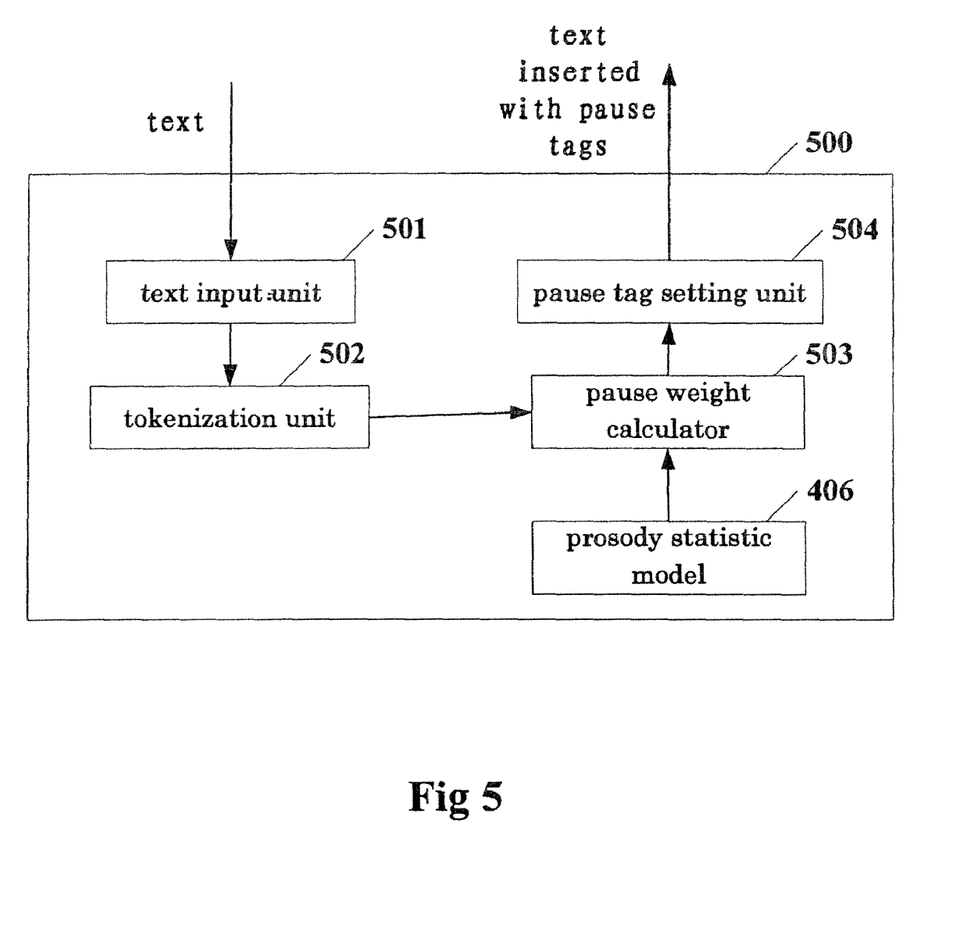
FIG. 5 is a block diagram of the apparatus for prosody parsing according to one embodiment of the invention.

Under the same inventive conception, FIG. 5 is a block diagram of the apparatus for prosody parsing according to one embodiment of the invention. The present embodiment will be described in the following in conjunction with FIG. 5. For the same elements as those in the above embodiments, the description thereof will be properly omitted.

As shown in FIG. 5, the apparatus 500 of the present embodiment for prosody parsing comprises: a text input unit 501 configured to input a text for prosody parsing, which includes at least one sentence; a tokenization unit 502 configured to transform each sentence in the imputed text into a token sequence; a pause weight calculator 503 configured to calculate a pause weight for each pause position in said token sequence based on a prosody statistic model 406 that is trained from a raw corpus and includes a plurality of token pairs and pause probabilities at associated positions of each said plurality of token pairs; and a pause tag setting unit 504 configured to select at least one pause positions to insert a pause tag according to the pause weight for each pause position in said sentence calculated by pause weight calculator 503.

As in the foregoing embodiments, in the present embodiment, said token is in the form of any one selected from character, word, word plus the part of speech and phrase. Said associated positions of said each token pair includes: before, after and amid said token pair.

Said pause weight calculator 503 is configured to calculate a pause weight for each pause position in said token sequence according to the pause probabilities at associated positions of corresponding token pairs in said prosody statistic model. For example, the pause weight calculator 503 calculates the pause weight for each pause position weight with $$weight = -\log(Prob_{ttp} \times Prob_{tpt} \times Prob_{ptt})$$

wherein $Prob_{ttp}$ represents the pause probability after the token pair that is located before said pause position, $Prob_{ptt}$ represents the pause probability before the token pair that is located after said pause position, and $Prob_{tpt}$ represents the pause probability amid the token pair that is located across said pause position.

In the present embodiment, preferably, said pause tag setting unit 504 is configured not to set a pause position after the first token of said token sequence or before the last token of said token sequence.

The pause tag setting unit 504 selects those pause positions of which the pause weight is higher than a predetermined threshold to insert a pause tag. Further, preferably, another condition needs to be satisfied, i.e., the number of tokens between two selected adjacent pause positions is larger than another predetermined threshold, which could avoid too many and too fragmentary pauses.

In addition, similar to the foregoing embodiments, preferably, when the prosody statistic model includes a token translation table, the tokenization unit 502 of the present embodiment can perform token translation by using the token translation table in said prosody statistic model. If the prosody statistic model does not contain a token translation table, then the tokenization unit 502 of the present embodiment can perform token translation by using its own token translation table or the token translation table obtained in other manners.

The apparatus 500 of the present embodiment for prosody parsing and its various components can be constructed with a specialized circuit or chip or be implemented by a computer (processor) executing a corresponding program. Also, the apparatus 500 of the present embodiment for prosody parsing may in operation implement the method for prosody parsing of the embodiment described in conjunction with FIG. 2.

Figure 6:
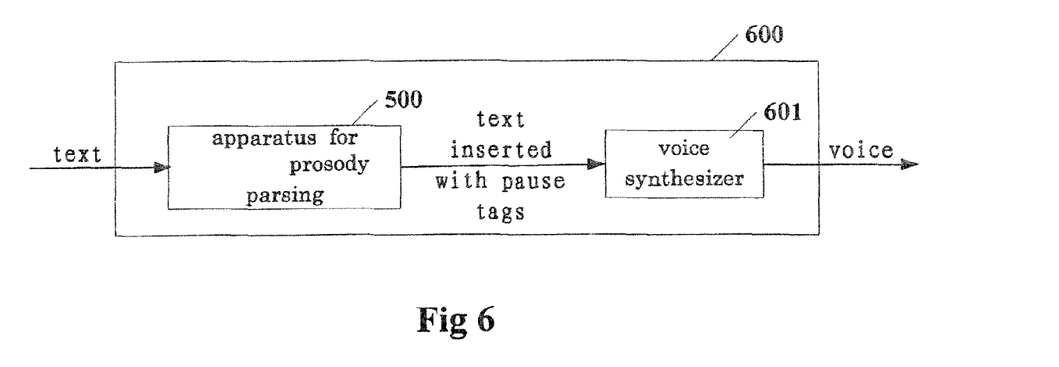
FIG. 6 is a block diagram of the system for text to speech synthesis according to one embodiment of the invention.

Under the same inventive conception, FIG. 6 is a block diagram of the system for text to speech synthesis according to one embodiment of the invention. The present embodiment will be described in the following in conjunction with FIG. 6. For the same elements as those in the above embodiments, the description thereof will be properly omitted.

As shown in FIG. 6, the system 600 of the present embodiment for text to speech synthesis comprises: an apparatus 500 for prosody parsing and a voice synthesizer 601. Wherein, the apparatus 500 for prosody parsing may be the apparatus for prosody parsing of the embodiment described in conjunction with FIG. 5. The text to be processed with voice synthesis is inputted into apparatus 500 for prosody parsing. The text with pause tags inserted by the apparatus 500 for prosody parsing is in turn inputted into voice synthesizer 601. Here, voice synthesizer 601 can be any voice synthesizer 601, as long as it can generate corresponding pauses in the synthesized voice according the pause tags in the text.

It should be noted that the system 600 of the present embodiment for text to speech synthesis and its various components can be constructed with a specialized circuit or chip or be implemented by a computer (processor) executing a corresponding program. The apparatus 500 for prosody parsing and the voice synthesizer 601 in the system 600 for text to speech synthesis and their respective components may be physically separated from but operatively connected to one another. For example, the apparatus 500 for prosody parsing and voice synthesizer 601 can be two physically separated devices transferring data via network or other communication media. The system 600 of the present embodiment for text to speech synthesis may in operation implement the method of text to speech synthesis of the embodiment described in conjunction with FIG. 2.

Figure 7:
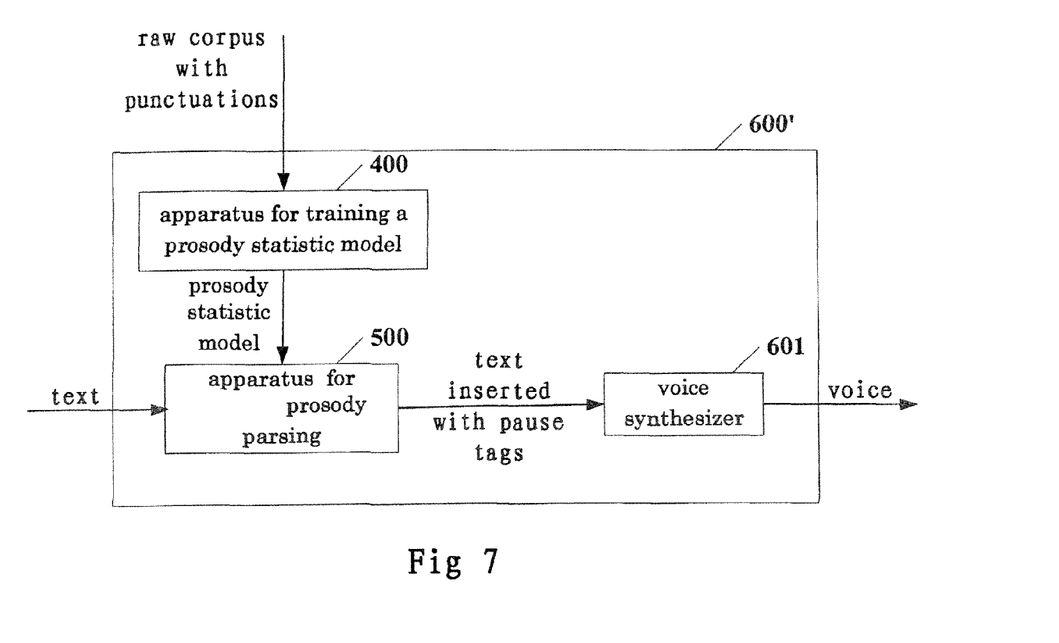
FIG. 7 is a block diagram of the system for text to speech synthesis according to another embodiment of the invention.

Under the same inventive conception, FIG. 7 is a block diagram of the system for text to speech synthesis according to another embodiment of the invention. The present embodiment will be described in the following in conjunction with FIG. 7. For the same elements as those in the above embodiments, the description thereof will be properly omitted.

As shown in FIG. 7, the system 600' of the present embodiment for text to speech synthesis differs from the embodiment shown in FIG. 6 in that it further comprises an apparatus 400 for training a prosody statistic model, which could be the apparatus for training a prosody statistic model with a raw corpus of the embodiment described in conjunction with FIG. 4.

The apparatus 400 for training a prosody statistic model trains a prosody statistic model with a raw corpus that has not been manually labeled, then provides the prosody statistic model to apparatus 500 for prosody parsing to perform prosody parsing.

Like the foregoing embodiments, the system 600' of the present embodiment for text to speech synthesis and its various components can be constructed with a specialized circuit or chip or be implemented by a computer (processor) executing a corresponding program. Also, the various components of system 600' for text to speech synthesis may be physically separated from but operatively connected to one another.

In practice, the apparatus 400 for training a prosody statistic model in the system 600' for text to speech synthesis of the present embodiment can perform training separately before the voice synthesis process, thus it is also called an "offline" module.

While a method and apparatus for training a prosody statistic model with a raw corpus, a method and apparatus of prosody parsing, and a method and system for voice synthesis of the present invention have been described in detail with some exemplary embodiments, these embodiments are not exhaustive, and those skilled in the art may make various variations and modifications within the spirit and scope of the present invention. Therefore, the present invention is not limited to these embodiments; rather, the scope of the present invention is solely defined by the appended claims.

The invention claimed is:

1. A method for training a prosody statistic model with a raw corpus that includes a plurality of sentences with punctuation, comprising:
    transforming said plurality of sentences in said raw corpus into a plurality of token sequences respectively;
    counting frequency of each adjacent token pair occurring in said plurality of token sequences and frequency of punctuation that represents a pause occurring at associated positions of said each token pair;
    calculating pause probabilities at said associated positions of said each token pair, based on the frequency of each adjacent token pair and the frequency of punctuation; and
    constructing said prosody statistic model based on said token pairs and said pause probabilities at associated positions thereof,
    wherein the transforming, the counting, the calculating and the constructing, are executed by a computer.

2. The method for training a prosody statistic model according to claim 1, wherein said associated positions of said each token pair include: before, after and amid said token pair.

3. The method for training a prosody statistic model according to claim 2, wherein said step of calculating pause probabilities at said associated positions of said each token pair comprises:
    calculating a pause probability before said token pair based on the frequency of said token pair and the frequency of punctuation representing a pause occurring before said token pair;
    calculating a pause probability after said token pair based on the frequency of said token pair and the frequency of punctuation representing a pause occurring after said token pair;
    calculating a pause probability amid said token pair based on the frequency of said token pair and the frequency of punctuation representing a pause occurring amid said token pair.

4. The method for training a prosody statistic model according to claim 3, wherein said step of calculating a pause probability before said token pair comprises:
    calculating the pause probability before said token pair $Prob_{ptt}$ with $$Prob_{ptt} = \frac{Count_{ptt}}{Count_{tt}}$$

wherein $Count_{tt}$ represents the frequency of said token pair, $Count_{ptt}$ represents the frequency of punctuation representing a pause occurring before said token pair.

5. The method for training a prosody statistic model according to claim 3, wherein said step of calculating a pause probability after said token pair comprises:
    calculating the pause probability after said token pair $Prob_{ttp}$ with $$Prob_{ttp} = \frac{Count_{ttp}}{Count_{tt}}$$

wherein $Count_{tt}$ represents the frequency of said token pair, $Count_{ttp}$ represents the frequency of punctuation representing a pause occurring after said token pair.

6. The method for training a prosody statistic model according to claim 3, wherein said step of calculating a pause probability amid said token pair comprises:
    calculating the pause probability amid said token pair $Prob_{tpt}$ with $$Prob_{tpt} = \frac{Count_{tpt}}{Count_{tt}}$$

wherein $Count_{tt}$ represents the frequency of said token pair, $Count_{tpt}$ represents the frequency of punctuation representing a pause occurring amid said token pair.

7. The method for training a prosody statistic model according to claim 1, wherein said step of calculating pause probabilities at said associated positions of said each token pair further comprises:
   performing smoothing process on said calculated pause probabilities.

8. The method for training a prosody statistic model according to claim 1, wherein said step of calculating pause probabilities at said associated positions of said each token pair further comprises:
   performing cutoff process on said calculated pause probabilities.

9. The method for training a prosody statistic model according to claim 1, wherein said token is in a form of any one selected from character, word, word plus part of speech and phrase.

10. The method for training a prosody statistic model according to claim 1, wherein said prosody statistic model includes a token translation table that stores each of the tokens involved in the prosody statistic model and a token ID corresponding to said token.

11. A method of prosody parsing, comprising:
   training a prosody statistic model by using the method of any one of claims 1-10;
   inputting a text for prosody parsing, which includes at least one sentence;
   transforming the sentence into a token sequence;
   calculating a pause weight for each pause position in said token sequence based on said prosody statistic model; and
   selecting at least one pause position to insert a pause tag according to said calculated pause weight for each pause position,
   wherein the training, the inputting, the transforming, the calculating and the selecting, are executed by a computer.

12. The method of prosody parsing according to claim 11, wherein said token is in a form of any one selected from character, word, word plus part of speech and phrase.

13. The method of prosody parsing according to claim 11, wherein said prosody statistic model includes a plurality of token pairs and pause probabilities at associated positions of each of said plurality of token pairs, said step of calculating a pause weight for each pause position in said token sequence comprises:
   calculating a pause weight for each pause position in said token sequence according to the pause probabilities at associated positions of corresponding token pairs in the prosody statistic model.

14. The method of prosody parsing according to claim 13, wherein the associated positions of each token pair includes before, after and amid said token pair, said step of calculating a pause weight for each pause position in said token sequence comprises:
   calculating the pause weight for each pause position with weight=−log($Prob_{ttp} \times Prob_{tpt} \times Prob_{ptt}$)

wherein $Prob_{ttp}$ represents the pause probability after the token pair that is located before said pause position, $Prob_{ptt}$ represents the pause probability before the token pair that is located after said pause position, and $Prob_{tpt}$ represents the pause probability amid the token pair that is located across said pause position.

15. The method of prosody parsing according to claim 13, wherein a pause position is not set after the first token of said token sequence or before the last token of said token sequence.

16. The method of prosody parsing according to claim 11, wherein said step of selecting at least one pause position to insert a pause tag is performed on condition that:
   the pause weight of a pause position is higher than a predetermined threshold.

17. The method of prosody parsing according to claim 11, wherein said step of selecting at least one pause position to insert a pause tag is performed on condition that:
   the pause weight of a pause position is higher than a predetermined threshold; and
   the number of tokens between two selected pause positions is larger than another predetermined threshold.

18. A method of text to speech synthesis, comprising:
   inserting at least one pause tag into the text by using the method of claim 11; and
   performing voice synthesis according to the text inserted with said at least one pause tag,
   wherein the inserting and the performing are executed by a computer.

19. An apparatus for training a prosody statistic model with a raw corpus that includes a plurality of sentences with punctuation, comprising:
   a tokenization unit configured to transform said plurality of sentences in said raw corpus into a plurality of token sequences respectively;
   a counter configured to count frequency of each adjacent token pair occurring in said plurality of token sequences and frequency of punctuation that represents a pause occurring at associated positions of said each token pair;
   a pause probability calculator configured to calculate pause probabilities at said associated positions of said each token pair, based on the frequency of each adjacent token pair and the frequency of punctuation; and
   a prosody statistic model constructor configured to construct said prosody statistic model based on said token pairs and said pause probabilities at associated positions thereof.

20. The apparatus for training a prosody statistic model according to claim 19, wherein said associated positions of said each token pair include: before, after and amid said token pair.

21. The apparatus for training a prosody statistic model according to claim 20, wherein said pause probability calculator is configured to calculate a pause probability before a token pair based on the frequency of said token pair and the frequency of punctuation representing a pause occurring before said token pair, to calculate a pause probability after said token pair based on the frequency of said token pair and the frequency of punctuation representing a pause occurring after said token pair, and to calculate a pause probability amid said token pair based on the frequency of said token pair and the frequency of punctuation representing a pause occurring amid said token pair.

22. The apparatus for training a prosody statistic model according to claim 21, wherein said pause probability calculator is configured to calculate the pause probability before said token pair $Prob_{ptt}$ with $$Prob_{ptt} = \frac{Count_{ptt}}{Count_{tt}}$$

wherein $Count_{tt}$ represents the frequency of said token pair, $Count_{ptt}$ represents the frequency of punctuation representing a pause occurring before said token pair.

23. The apparatus for training a prosody statistic model according to claim 21, wherein said pause probability calculator is configured to calculate the pause probability after said token pair $Prob_{ttp}$ with $$Prob_{ttp} = \frac{Count_{ttp}}{Count_{tt}}$$

wherein $Count_{tt}$ represents the frequency of said token pair, $Count_{ttp}$ represents the frequency of punctuation representing a pause occurring after said token pair.

24. The apparatus for training a prosody statistic model according to claim 21, wherein said pause probability calculator is configured to calculate the pause probability amid said token pair $Prob_{tpt}$ with $$Prob_{tpt} = \frac{Count_{tpt}}{Count_{tt}}$$

wherein $Count_{tt}$ represents the frequency of said token pair, $Count_{tpt}$ represents the frequency of punctuation representing a pause occurring amid said token pair.

25. The apparatus for training a prosody statistic model according to claim 19, further comprising:
a smoothing unit configured to perform smoothing process on said calculated pause probabilities.

26. The apparatus for training a prosody statistic model according to claim 19, further comprising:
a cutoff unit configured to perform cutoff process on said calculated pause probabilities.

27. The apparatus for training a prosody statistic model according to claim 19, wherein said token is in a form of any one selected from character, word, word plus part of speech and phrase.

28. An apparatus for prosody parsing, comprising:
a text input unit configured to input a text for prosody parsing, which includes at least one sentence;
a tokenization unit configured to transform the sentence into a token sequence;
a pause weight calculator configured to calculate a pause weight for each pause position in said token sequence based on a prosody statistic model that is trained by using the apparatus of claim 19; and
a pause tag setting unit configured to select at least one pause position to insert a pause tag according to said calculated pause weight for each pause position.

29. The apparatus for prosody parsing according to claim 28, wherein said token is in a form of any one selected from character, word, word plus part of speech and phrase.

30. The apparatus for prosody parsing according to claim 28, wherein said pause weight calculator is configured to calculate a pause weight for each pause position in said token sequence according to the pause probabilities at associated positions of corresponding token pairs in the prosody statistic model.

31. The apparatus for prosody parsing according to claim 30, wherein the associated positions of each token pair includes before, after and amid said token pair, said pause weight calculator is configured to calculate the pause weight for each pause position with weight=$-\log(Prob_{ttp} \times Prob_{tpt} \times Prob_{ptt})$ wherein $Prob_{ttp}$ represents the pause probability after the token pair that is located before said pause position, $Prob_{ptt}$ represents the pause probability before the token pair that is located after said pause position, and $Prob_{tpt}$ represents the pause probability amid the token pair that is located across said pause position.

32. The apparatus for prosody parsing according to claim 30, wherein said pause tag setting unit is configured not to set a pause position after the first token of said token sequence or before the last token of said token sequence.

33. The apparatus for prosody parsing according to claim 28, wherein said pause tag setting unit is configured to select at least one pause position to insert a pause tag on condition that:
the pause weight of a pause position is higher than a predetermined threshold.

34. The apparatus for prosody parsing according to claim 28, wherein said pause tag setting unit is configured to select at least one pause position to insert a pause tag on condition that:
the pause weight of a pause position is higher than a predetermined threshold; and
the number of tokens between two selected pause positions is larger than another predetermined threshold.

35. A system for text to speech synthesis, comprising:
an apparatus for prosody parsing according to claim 28; and
a voice synthesizer configured to perform voice synthesis according to the text inserted with said at least one pause tag.

* * * * *